(12) United States Patent
Strein et al.

(10) Patent No.: US 11,695,732 B2
(45) Date of Patent: Jul. 4, 2023

(54) ARCHITECTURE FEATURES FOR A MEDIA-CENTRIC FIREWALL

(71) Applicant: Disney Enterprises, Inc., Burbank, CA (US)

(72) Inventors: Michael J. Strein, Bohemia, NY (US); Benjamin H. Kepler, Palisades, NY (US)

(73) Assignee: Disney Enterprises Inc., Burbank, CA (US)

( * ) Notice: Subject to any disclaimer, the term of this patent is extended or adjusted under 35 U.S.C. 154(b) by 303 days.

(21) Appl. No.: 17/319,350

(22) Filed: May 13, 2021

(65) Prior Publication Data

US 2022/0368673 A1    Nov. 17, 2022

(51) Int. Cl.
*H04L 9/40* (2022.01)
*H04L 41/08* (2022.01)

(52) U.S. Cl.
CPC ...... *H04L 63/0263* (2013.01); *H04L 41/0886* (2013.01); *H04L 63/0236* (2013.01); *H04L 63/20* (2013.01)

(58) Field of Classification Search
CPC ............. H04L 63/0263; H04L 41/0886; H04L 63/0236; H04L 63/20; H04L 63/0807; H04L 41/082
See application file for complete search history.

(56) References Cited

U.S. PATENT DOCUMENTS

| 11,228,564 B2* | 1/2022 | Strein | H04L 65/65 |
| 2002/0107953 A1* | 8/2002 | Ontiveros | H04L 43/06 709/224 |
| 2003/0167405 A1* | 9/2003 | Freund | H04L 63/20 709/223 |
| 2004/0078591 A1* | 4/2004 | Teixeira | H04L 63/0227 709/225 |
| 2006/0109977 A1* | 5/2006 | Grannan | H04M 3/42136 379/265.09 |
| 2007/0134068 A1* | 6/2007 | Smith | G06F 9/4401 406/39 |
| 2007/0136356 A1* | 6/2007 | Smith | G06F 9/545 707/999.102 |
| 2008/0022385 A1* | 1/2008 | Crowell | H04L 63/0263 726/11 |

(Continued)

OTHER PUBLICATIONS

U.S. Appl. No. 16/983,063, "Non-Linear Management of Real Time Sequential Data in Cloud Instances via Time Constraints", filed Aug. 3, 2020.

*Primary Examiner* — John B King
(74) *Attorney, Agent, or Firm* — Farjami & Farjami LLP

(57) ABSTRACT

The embodiments herein describe a firewall for a media production system to provide flexible security between an on-premises production environment and remote media production applications and devices (e.g., cloud-based virtual production environments). As new media devices and applications (referred to generally as media nodes) are added at remote locations, the firewall is updated to permit the media nodes to communicate with the on-premises production environment. The embodiments herein described an automatic (e.g., software driven) process where a network orchestrator can detect a change in the media nodes and update the rule set in the firewall accordingly.

21 Claims, 6 Drawing Sheets

(56) References Cited

U.S. PATENT DOCUMENTS

| | | | |
|---|---|---|---|
| 2008/0289026 A1* | 11/2008 | Abzarian | H04L 41/0806 726/11 |
| 2009/0064309 A1* | 3/2009 | Boodaei | G06F 21/52 726/12 |
| 2013/0179991 A1* | 7/2013 | White | G06F 21/53 726/29 |
| 2013/0227670 A1* | 8/2013 | Ahmad | H04L 63/20 709/217 |
| 2013/0305341 A1* | 11/2013 | Baker | H04W 28/26 726/11 |
| 2014/0245423 A1* | 8/2014 | Lee | H04L 63/20 726/12 |
| 2014/0280809 A1* | 9/2014 | Li | H04L 41/0886 709/222 |
| 2016/0112374 A1* | 4/2016 | Branca | H04L 63/102 726/1 |
| 2017/0250951 A1* | 8/2017 | Wang | H04L 41/0894 |
| 2018/0183760 A1* | 6/2018 | Kurkure | H04L 63/20 |
| 2018/0286456 A1* | 10/2018 | Biskeborn | G11B 5/3106 |
| 2019/0141015 A1* | 5/2019 | Nellen | H04B 61/4511 |
| 2019/0179687 A1* | 6/2019 | Wilkinson | G06F 11/2221 |
| 2020/0403972 A1 | 12/2020 | Strain et al. | |
| 2020/0404033 A1 | 12/2020 | Strein et al. | |
| 2020/0404034 A1 | 12/2020 | Strain et al. | |
| 2020/0404035 A1 | 12/2020 | Strain et al. | |
| 2021/0067556 A1* | 3/2021 | Tahan | H04L 63/0263 |
| 2021/0365247 A1* | 11/2021 | Fletcher | G06F 11/324 |
| 2022/0052922 A1* | 2/2022 | Meyer | G06F 8/60 |
| 2022/0116423 A1* | 4/2022 | Cummins | H04L 63/20 |
| 2022/0210200 A1* | 6/2022 | Crabtree | G06F 16/951 |
| 2022/0337555 A1* | 10/2022 | Gol | H04L 63/029 |

\* cited by examiner

ARCHITECTURE FEATURES FOR A MEDIA-CENTRIC FIREWALL

BACKGROUND

Security in media networks has traditionally been managed using so called "air gaps," in which the media networks are prevented from having external connectivity. As it has become increasingly important for media network nodes to connect to resources outside of a local environment, such as to a post-production facility or an Internet connected feed for example, security has typically been provided through the manual management of destination Internet Protocol (IP) addresses, the manual opening of switch ports, and the manual configuration of firewalls. However, as media production migrates from traditional on-premises production facilities to cloud-based production resources requiring the transport of media flows into and out of a public cloud, there is a need in the art for a nimble security solution capable of ensuring media flow integrity in a dynamic network environment.

SUMMARY

One embodiment described herein is a method and a computer readable medium that includes providing a silo in a firewall containing a rule set that is preauthorized for dynamic changes where the firewall protects an on-premises media production environment, detecting at least one of an addition or a subtraction of a media node in a remote media production environment, generating a rule change for the firewall that at least one of (i) permits an added media node to communicate with the on-premises media production environment or (ii) prohibits a subtracted media node from communicating with the on-premises media production environment, transmitting the rule change to the firewall, and upon determining, at the firewall, that the rule change affects the rule set in the silo, updating the rule set based on the rule change.

Another embodiment described herein is a system that includes a local network configured to provide a service and a firewall configured to protect the local network from unauthorized access. The firewall includes a first silo containing a first rule set preauthorized for dynamic changes and a second silo containing a second rule set that is not authorized for dynamic changes. The system also includes a network orchestrator configured to detect at least one of an addition or a subtraction of a computing resource in a remote network, where the computing resource is configured to perform tasks corresponding to the service in the local network, generate a rule change for the firewall that at least one of (i) permits an added computing resource to communicate with the service in the local network or (ii) prohibits a subtracted computing resource from communicating with the local network, and transmit the rule change to the firewall, wherein the firewall is configured to update the first rule set based on the rule change only after determining the rule change affects the first rule set in the first silo and not the second rule set in the second silo.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The embodiments herein describe a firewall for a media production system to provide flexible security between an on-premises production environment and remote media production applications and devices (e.g., cloud-based virtual production environments). As new media devices and applications (referred to generally as media nodes) are added at remote locations, the firewall is updated to permit the media nodes to communicate with the on-premises production environment. However, updating a firewall is typically a manual process which requires an engineer to update a rule set and perform a validation process. In contrast, the embodiments herein describe an automatic (e.g., software driven) process where a network orchestrator can detect a change in the media nodes and update the rule set in the firewall accordingly.

In one embodiment, the settings of the firewall are divided into different containers or silos where some of the settings can be dynamically changed by the network orchestrator while other settings cannot. For example, a rule set that can open/close ports or allow/block IP address may be in a silo that can be accessed and updated by the network orchestrator. However, other rule sets that enable/disable file transfer protocol (FTP) or change an authentication method are in silos that cannot be updated by the network orchestrator. Stated differently, the network orchestrator may be preauthorized to change settings in certain silos in the firewall without requiring the firewall to be re-validated by an engineer. This provides greater flexibility for the firewall to respond, in real-time, to changes in the media production environment.

A media-centric firewall can also be expanded to include other features such as authenticating external media nodes using tokens or certificates applied to names associated with the media nodes. This enables enhanced security as media nodes are added to remote production environments. Further, the firewall can enable the protected environment to be divided into microsegments (or subnets) where data flows are permitted to communicate with a subportion of the microsegments. Stated differently, the firewall can enable a zero-trust concept where data flows are allowed to communicate with a particular microsegment in the environment only after being authorized.

Figure 1:
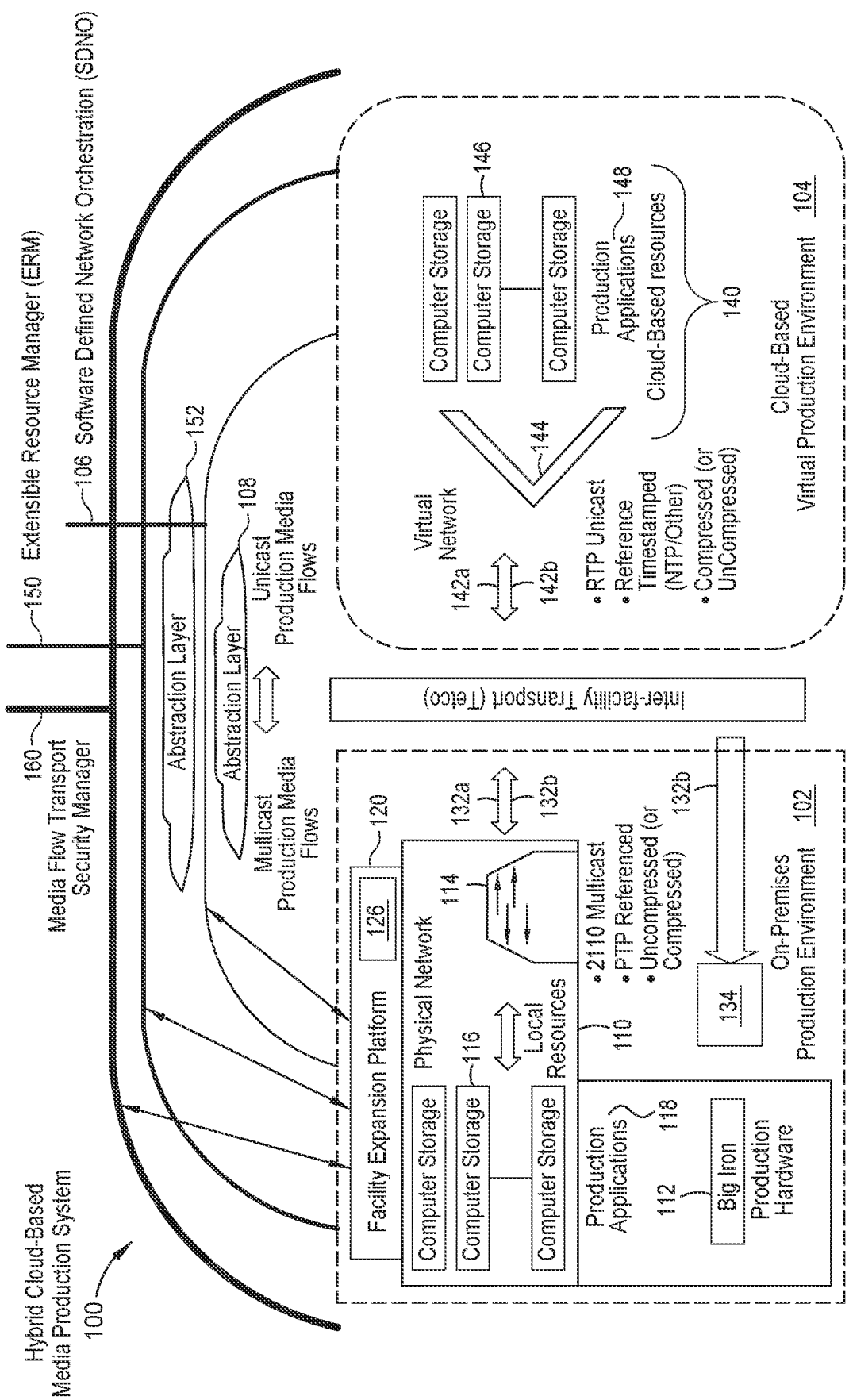
FIG. 1 illustrates a diagram of an exemplary hybrid cloud-based media production system, according to one embodiment.

FIG. 1 shows exemplary hybrid cloud-based media production system 100, according to one implementation. As shown in FIG. 1, the hybrid cloud-based media production system 100 includes on-premises production environment 102 interactively linked with cloud-based virtual production environment 104. As shown in FIG. 1, on-premises production environment 102 includes local resources 110 generating multicast production media flows 132a and communicatively coupled to facility expansion platform 120. Local resources 110 include "big iron" production hardware 112 (e.g., a dedicated, purpose built hardware for a specific application), local physical production network 114, local computing and data storage resources 116, and local production applications 118. In addition, FIG. 1 illustrates Software Defined Network Orchestration (hereinafter "SDNO") 106 that is managed by a network orchestrator (not shown) of the system. SDNO 106 is supported by extensible resource manager (ERM) 150 and a media flow transport security manager 160. FIG. 1 also includes a graphical user interface (GUI) 126 of facility expansion platform 120 providing a production monitoring and/or control dashboard for an optional user of the hybrid cloud-based media production system 100. Also shown in FIG. 1 are abstraction layer 108 associated with the SDNO 106, and abstraction layer 152 associated with ERM 150. Although not shown, the hybrid cloud-based media production system 100 can include communication links between SDNO 106 and ERM 150 and between SDNO 106 and the media flow transport security manager 160, which may also be provided by an application programming interface (API), as well as a communication link between ERM 150 and the media flow transport security manager 160, which may also be provided by an API.

With respect to the abstraction layer 108 associated with SDNO 106, and the abstraction layer 152 associated with ERM 150, in one embodiment an abstraction layer is a series of software services (often called micro services) providing and accomplishing specific functions. In this example, the abstraction layer 108 supports both "east/west" lateral communications between other software services and "north/south" vertical communications between the layers that call these services for SDNO 106, while the abstraction layer 152 provides analogous communications support for ERM 150.

The cloud-based virtual production environment 104 includes cloud-based resources 140 configured to receive and process cloud production media flows 142a corresponding to multicast production media flows 132a, thereby generating post-production cloud media flows 142b. As shown in FIG. 1, the cloud-based resources 140 include cloud bandwidth 144, cloud-based computing and data storage resources 146, and cloud-based production applications 148. Also shown in FIG. 1 is physical, i.e., not cloud-based or virtual, production facility 134 that receives post-production multicast media flows 132b corresponding to post-production cloud media flows 142b.

It is noted that the physical post-production facility 134 may be another production facility similar to on-premises production environment 102, or may be a media distribution hub, such as a regional affiliate or other affiliated media distributor. In one embodiment, the post-production multicast media flows 132b correspond to the post-production cloud media flows 142b after the post-production cloud media flows 142b are converted from a cloud permissible media flow type, such as unicast, to multicast. The cloud production media flows 142a can be processed to generate post-production cloud media flows 142b using the cloud-based virtual production environment 104.

"Multicast" is a term used to describe communication in which a piece of information is sent from one or more points to a set of other points. In this case there may be one or more senders, and the information is distributed to a group of receivers. One example of an application which may use multicast is a video server sending out networked television channels. Concurrent delivery of high quality video to each of a large number of delivery platforms will exhaust the capability of even a high bandwidth network with a powerful video clip server. This poses a major scalability issue for applications which require sustained high bandwidth. One way to significantly ease scaling to larger groups of clients is to employ multicast networking. Multicasting is the networking technique of delivering the same packet concurrently to a group of clients. IP multicast provides dynamic many-to-many connectivity between a set of senders (at least one) and a group of receivers.

The format of an IP multicast packet is identical to that of unicast packets and is distinguished by using a special class of destination address (i.e., class D IPV4 address), which denotes a specific multicast group. Since Transmission Control Protocol (TCP) supports only the unicast mode, multicast applications typically use the User Datagram Protocol (UDP) transport protocol. Unlike broadcast transmission, which is used on some local area networks (LANs), multicast clients receive a stream of packets only if they have previously elected to do so, for example by joining the specific multicast group address. Membership of a group may be dynamic and may be controlled by the receivers, which are informed by the local client applications. The routers in a multicast network learn which sub-networks have active clients for each multicast group and attempt to minimize the transmission of packets across parts of the network for which there are no active clients. The multicast mode is useful if a group of clients require a common set of data at the same time, or when the clients are able to receive and store common data until needed. Where there is a common need for the same data required by a group of clients, multicast transmission may provide significant bandwidth savings, for example, up to 1/N of the bandwidth compared to N separate unicast clients.

In cloud-based computing environments, whether they are public or private, multicast flow management has typically been impermissible due in part to the unpredictable demands that multicast signals can place on cloud bandwidth. However, the cloud-based virtual production environment 104 may evolve to accommodate multicast flow management. Consequently, in some implementations the cloud production media flows 142a and the post-production cloud media flows 142b may be multicast media flows. Nevertheless, most present use cases convert the multicast production media flows 132a into unicast production media flows prior to being processed in the cloud-based virtual production environment 104. Thus in some embodiments, the cloud production media flows 142a may be unicast production media flows 142a, and the post-production cloud media flows 142b may be post-production unicast media flows 142b.

In contrast to multicast, "unicast" describes communication in which a piece of information is sent from one point to another point. In this case, there is just one sender and one receiver. Unicast transmission, in which a packet is sent from a single source to a specified destination, is a predominant form of transmission on LANs and within the Internet. All LANs, such as Ethernet, for example, as well as IP networks, support the unicast transfer mode. Examples of the standard unicast applications supported by LANs and IP networks include Hypertext Transfer Protocol (HTTP), Simple Mail Transfer Protocol (SMTP), File Transfer Protocol (FTP), and Telnet, each of which employs TCP.

The hybrid cloud-based media production system 100 provides an exemplary framework by which on-premises production environment 102 can scale larger by expanding into the cloud-based virtual production environment 104. That expansion may include the following:

1) Media-over-IP multicast production media flows 132a are converted to unicast or other cloud permissible production media flows 142a as they move into the cloud-based virtual production environment 104.

2) SDNO 106 extends into the cloud-based virtual production environment 104 from the on-premises production environment 102 to manage the cloud production media flows 142a in the cloud-based virtual production environment 104, creating a virtual network managing the bandwidth and allocation of the cloud production media flows 142a, as well as announcing and discovering the cloud-based resources 140. In other words, SDNO 106 enables cloud-based resources 140 for corresponding production processes and manages the connections. In one embodiment, this is accomplished by the cloud providers supplying standard APIs to cloud-based resources 140.

3) ERM 150 communicates with SDNO 106 and coordinates and schedules cloud-based resources 140 used by the media workflows, spinning up computing and storage processes as needed, and loading the required applications. ERM 150 can additionally manage the licenses for the applications, should additional application be desired. ERM 150 of the cloud-based resources 140 and licensing may be API-based such that ERM 150 can present media based dashboard to a user via the GUI 126 of the hybrid cloud-based media production system 100, while allocating the appropriate resources from the cloud provider.

4) Conversion of one or more multicast production media flows 132a into one or more cloud production media flows 142 is typically performed before delivery of one or more cloud production media flows 142a into cloud bandwidth 144 of cloud-based virtual production environment 104. The media flow transport security manager 160 communicates with SDNO 106 and ERM 150 to dynamically control a firewall (not shown in FIG. 1) to route one or more of the cloud production media flows 142a from the on-premises production environment 102 to the cloud-based virtual production environment 104 or to route post-production cloud media flows 142b from the cloud-based virtual production environment 104 to the on-premises production environment 102. The media flow transport security manager 160 ensures the integrity of the cloud production media flows 142a and post-production cloud media flows 142b, while concurrently minimizing transport latency due to packet inspection.

Figure 2:
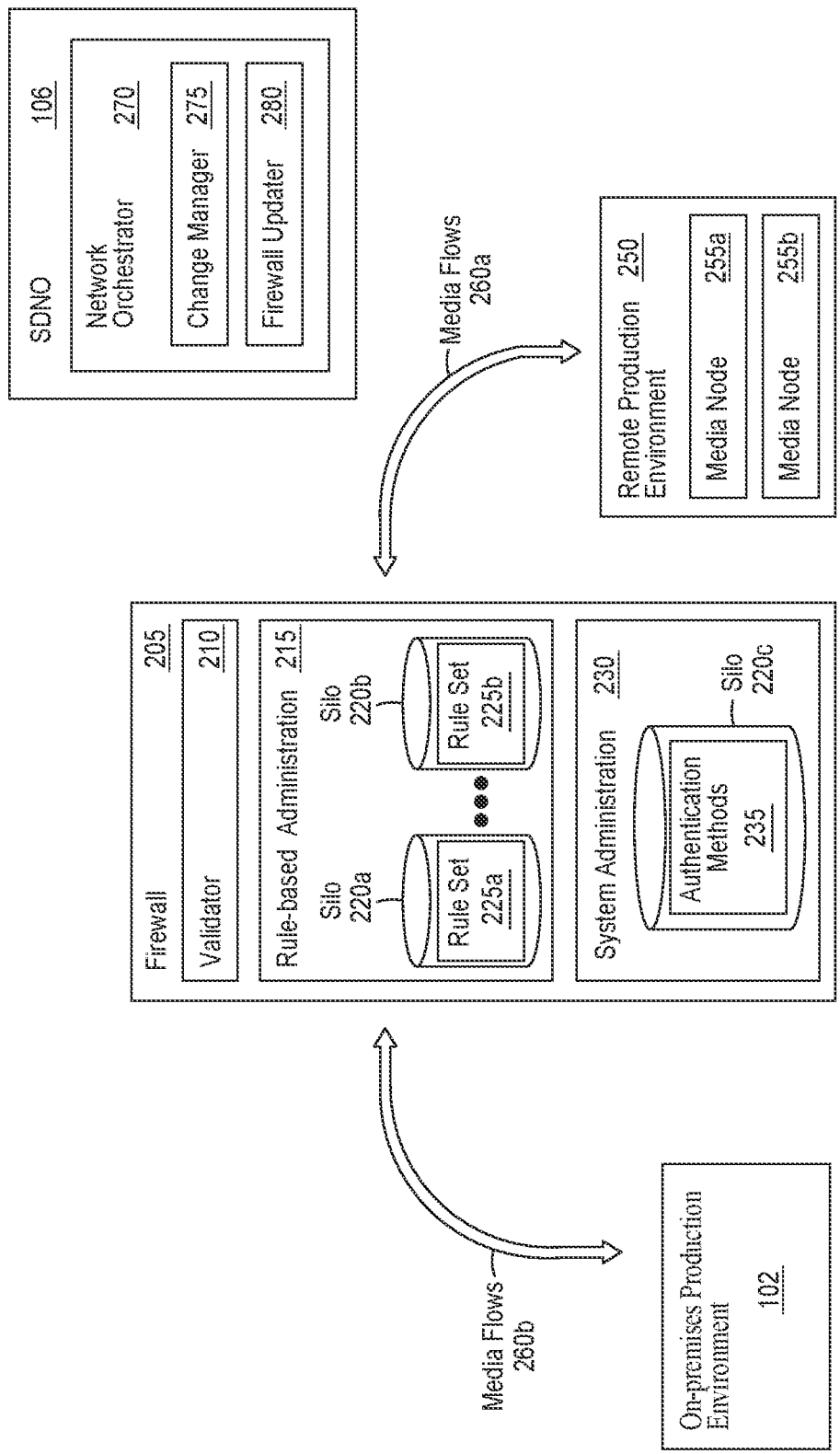
FIG. 2 illustrates a firewall with settings arranged into silos, according to one embodiment.

FIG. 2 illustrates a firewall 205 with settings arranged into silos 220, according to one embodiment. A media production environment is constantly expanding and contracting as the resources used by the on-premises production environment 102 changes. To satisfy these changing needs, a remote production environment 250 can add and remove media nodes 255 which are audio/video sources that can include media production applications (e.g., video editing applications, sound editing applications, storage applications, scheduling applications, etc.) and media production devices (e.g., cameras, sound equipment, servers, etc.). One example of a remote production environment 250 is the cloud-based virtual production environment 104 illustrated in FIG. 1. However, in another example, the remote production environment 250 may be a studio or production center that is disposed at a different geographic location than the on-premises production environment 102.

The firewall 205 provides data security between the on-premises production environment 102 and the remote production environment 250 (and any other remote networks). One goal of the firewall 205 is to ensure the media resources in the on-premises production environment 102 can communicate with the media nodes 255 in the remote production environment 250 but also block nefarious or unauthorized entities (e.g., whether human or applications) from accessing the on-premises production environment 102. However, typical firewalls are not optimized for dynamic media production environments where different media nodes are frequently being added and removed. Generally, firewalls are protection devices that do packet inspection of IP traffic and are typically installed at the perimeter of a LAN. Firewalls can be stateless, where they only do packet filtering, or stateful, where the connection states are determined. Current firewalls rely on static access control lists (ACLs) which allow connections to certain endpoints (as defined by IP addresses) and only through defined open ports. A firewall can have cleanlists and blocklists that define what traffic the firewall allows to ingress or egress the LAN. As used herein, a cleanlist includes a list of identification information flow (e.g., IP address, MAC address, port number, name, and the like) associated with a network device, compute node, network flow, or media flow that is permitted to communicate with the network protected by the firewall 205 (e.g., the on-premises production environment 102). A blocklist, in contrast, includes a list of identification information associated with a network device, compute node, network flow, or media flow that is explicitly not permitted to communicate with the network protected by the firewall 205. Further, firewalls can be software or a hardware appliance in a network-connected device.

In environments such as a media production environment where media nodes 255 can be added at any time, the media nodes 255 can provide a continuous stream of content that should be kept to a minimum latency and cannot be disrupted by the firewall 205. As such, FIG. 2 illustrates a system where the firewall 205 can be automatically updated to facilitate the addition (and removal) of media nodes 255 in the remote production environment 250 without human intervention. To do so, FIG. 2 includes the SDNO 106 from FIG. 1 which includes a network orchestrator 270 (e.g., a software application executing on a processor in a computing system) that can identify changes in the media production environment and update the firewall 205 in response to those changes. Specifically, the network orchestrator 270 includes a change manager 275 and a firewall updater 280 tasked with identifying changes in the remote production environment 250 and updating the firewall 205 to accommodate those changes.

For example, the change manager 275 can communicate with ERM 150 in FIG. 1 to identify changes in the remote production environment 250. Stated differently, ERM 150 can communicate with the SDNO 106 and activate and disable the media nodes 255. In this manner, ERM 150 can push updates to the change manager 275 so that the network orchestrator 270 is aware when media nodes 255 have been added. ERM 150 can also provide identification data corresponding to the media nodes 255 such as IP addresses, MAC addresses, and the like.

The firewall updater 280 updates the firewall 205 so the newly added media nodes can communicate with the media resources in the on-premises production environment 102.

In FIG. 2, it is assumed that media node 255a was already active in the remote production environment 250 and permitted by the firewall to communicate with the on-premises production environment 102. However, the media node 255b has just been activated (as represented by the dotted lines) in the remote production environment 250, and as such, the firewall 205 is unaware of the media node 255b. If the media node 255b attempts to communicate with resources in the on-premises production environment 102, the firewall 205 will block the communication.

The firewall updater 280 generates a rule change for the firewall 205 that permits the new media node 255b to communicate with the on-premises production environment 102. Updating the rules in the firewall, however, is typically a manual process that requires human intervention (e.g., a system engineer or administrator) to update the rule. That is, a system engineer would have to enter in the IP address of the media node 255b into the cleanlist or open up a port for the media node 255b. Further, this update might be validated by a validator 210 in the firewall 205 to ensure the rule change does not conflict with other rules. However, this manual update and validation process is slow and negates many of the advantages of using the hybrid media production system 100 illustrated in FIG. 1.

Instead, the firewall 205 include silos 220 (e.g., data stores, a file system, a database, etc.) for storing rule sets 225 that are preauthorized or pre-validated by the validator 210. For the silos 220 containing the preauthorized rule sets 225, the firewall updater 280 in the network orchestrator 270 can change these rules without human intervention and without repeating a validation process. For example, the firewall 205 includes a rule-based administration portion 215 and a system administration portion 230 that each includes silos 220. The rule-based administration portion 215 includes multiple silos 220 for different rule sets 225. For example, the silo 220a contains a preauthorized (or pre-validated) rule set 225a while the silo 220b contains a rule set 225b that is not preauthorized. As such, if the firewall updater 280 sends a rule change for the rule set 225a, then the validator 210 permits the change to update the rule set 225a. However, if the firewall updater 280 attempts to change a rule in the rule set 225b, then the validator 210 denies the request. Updating the rule set 225b may require the validator 210 to go through the traditional (manual) validation process, while the rule set 225a can be updated automatically or programmatically by the firewall updater 280 in the network orchestrator 270. While two silos 220 are shown in the rule-based administration portion 215, it can include any number of silos.

The system administration portion 230 includes a silo 220c that contains one or more authentication methods 235. Like the rule set 225b, the firewall updater 280 may not be permitted to change the authentication methods 235. That is, any changes to the authentication methods 235 may be performed using a manual validation process that relies on input from an engineer. Thus, the firewall 205 includes multiple silos 220 that divide up different types of settings (e.g., rule-based settings and system-level settings), as well as dividing up the same type of setting (e.g., different rule sets). The silos 220 can then be preauthorized (or not preauthorized) so that updates to the corresponding settings can be made programmatically by the network orchestrator 270 in response to changes in the media production environment. In this manner, the firewall 205 can quickly adapt to changes so the media flows 260a and 260b between the on-premises production environment 102 and remote production environment 250 are not disrupted.

While FIG. 2 illustrates media production environments (e.g., the environments 102 and 250), the embodiments herein can be extended to any local network being protected by a firewall that needs to communicate with computing resources in a remote network. For example, a local network can host a service or application that wants to use a computing resource (e.g., a virtual machine, container, or lambda function) in a remote network (e.g., a cloud-based network or datacenter) to perform tasks. The firewall 205 can be dynamically updated in real-time as discussed herein to permit the external computing resources to communicate with the local network. Put differently, the embodiments herein can apply to IP flows outside of media production environments as long as authenticated and approved orchestration exists, such as provided by the firewall updater 280 and the validator 210.

Figure 3:
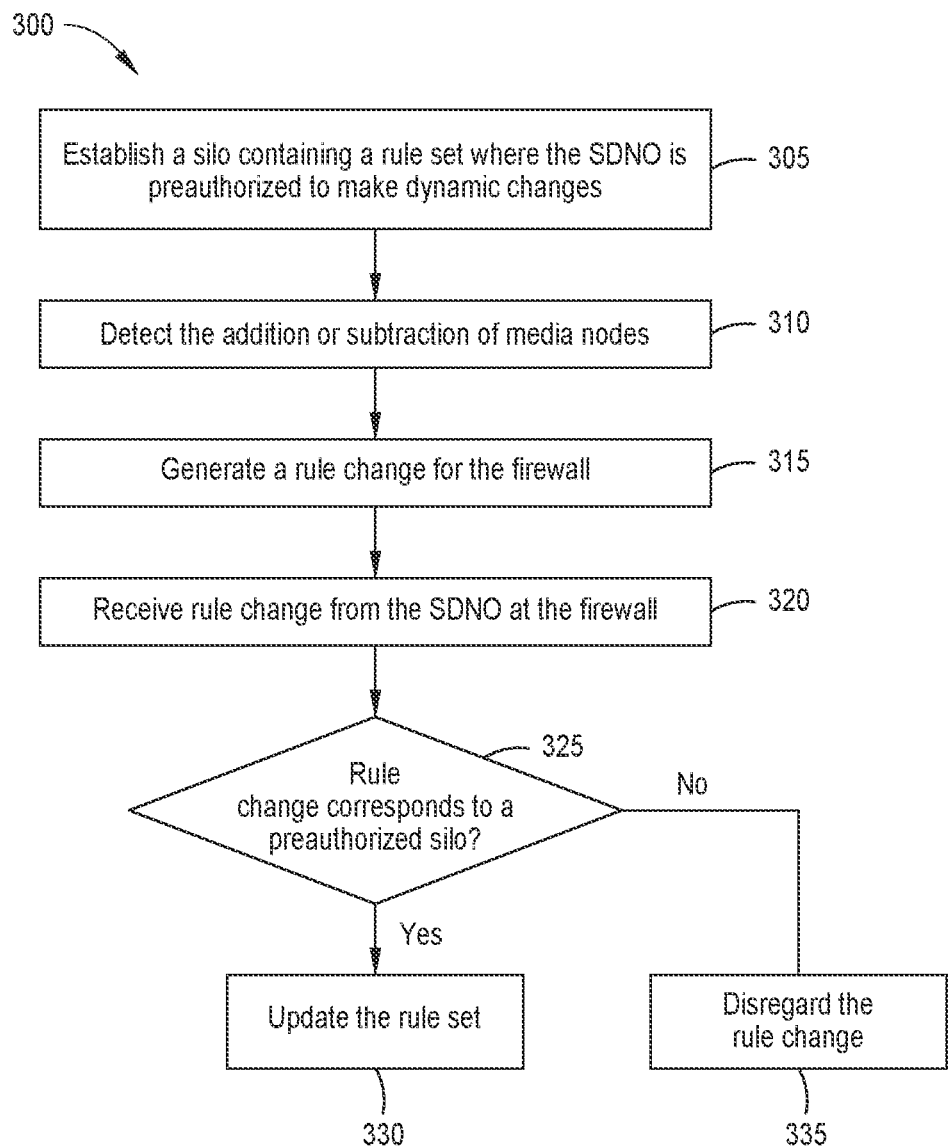
FIG. 3 is a flowchart for updating a firewall in response to changes in a remote production environment, according to one embodiment.

FIG. 3 is a flowchart of a method 300 for updating a firewall in response to changes in a remote production environment, according to one embodiment. At block 305, an engineer or system administrator establishes a silo in the firewall containing a rule set where the SDNO is preauthorized to make dynamic changes. Referring to FIG. 2, the firewall 205 can contain multiple silos (e.g., containers) where some contain settings (e.g., rule sets) that can be changed automatically by SDNO 106 (e.g., the network orchestrator 270) and others that cannot. The silo may contain rules such as which IP addresses are included in a cleanlist or blocklist, or which ports are open or closed. For example, the silo may contain a Security Management System which maintains a database of all the media node endpoints (and their corresponding IP addresses). In contrast, a rule set that is not preauthorized may include rules governing whether FTP is enabled on a port. This rule set may be stored in a different silo from the preauthorized rule set.

At block 310, the change manager detects the addition or subtraction of media nodes. In one embodiment, the change manager is informed of a change by ERM. In one embodiment, the ERM uses APIs and microservices to communicate with external networks such as the cloud-based virtual production environment 104 in FIG. 1 to learn when a media node (e.g., computer storage 146 or production applications 148) are added or removed. For example, the ERM can communicate with all the media nodes (e.g., to manage licenses for items that are spun up on premise or in cloud), and thus, can detect when these nodes are added or removed.

At block 315, the firewall updater generates a rule change for the firewall based on the detected change to the media nodes. For example, if a new media node is added, the rule change may add its corresponding IP address to the cleanlist, or open a port to which the media node is connected. If a media node has been removed, the rule change may remove its IP address from the cleanlist or close the port it was using to communicate with the firewall.

At block 320, the firewall receives the rule change from the network orchestrator in the SDNO, and at block 325, the validator in the firewall determines whether the rule change corresponds to a preauthorized silo. That is, the validator determines whether the rule change affects a setting in a preauthorized silo rather than settings stored in a silo that require manual validation (non-authorized silo).

If so, the method 300 proceeds to block 330 where the validator updates the rule set in the silo. If not, the method 300 instead proceeds to block 335 where the validator disregards the rule change. In this manner, the rules or settings of the firewall can be divided into preauthorized and non-authorized silos, where the settings in the preauthorized settings can be updated automatically in response to changes in the media production environment. Updating the settings in the non-authorized silos may require a manual update and validate process.

Figure 4:
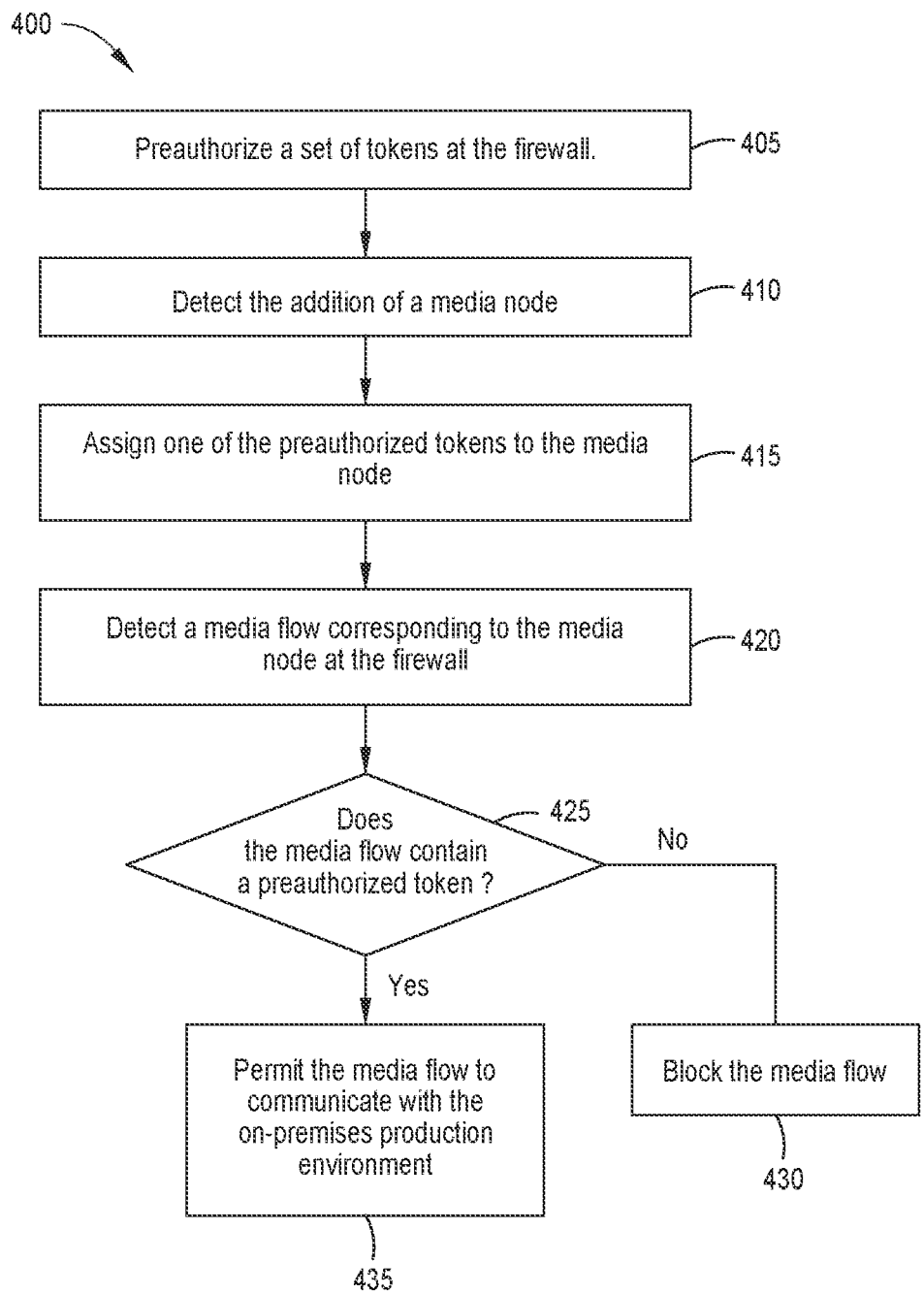
FIG. 4 is a flowchart for using preauthorized tokens to authenticate media nodes, according to one embodiment.

FIG. 4 is a flowchart of a method 400 for using preauthorized tokens to authenticate media nodes, according to one embodiment. The method 400 can add another layer of security to the firewall update process described in FIG. 3. However, the method 400 in FIG. 4 can also be used independently of the method 300 in FIG. 3. In generally, the method 400 permits media nodes to add tokens to their media flows which can be used by the firewall to authenticate the media nodes.

At block 405, the network orchestrator preauthorizes a set of tokens at the firewall. For example, the network orchestrator may provide a list of the preauthorized tokens to the firewall. This may be performed before the network orchestrator assigns the tokens to any media nodes.

In one embodiment, the tokens are certificates that can be generated by an authorized certificate authority (CA). For example, the tokens could be certificates that are typically used for secure website content delivery such as HTTPS.

At block 410, the network orchestrator detects the addition of a media node. In one embodiment, the network orchestrator is informed of a change by the ERM.

At block 415, the network orchestrator assigns one of the preauthorized tokens to the media node. For example, the network orchestrator may select (or generate) the token for the media node and then forward this token to the ERM. When activating the media node, the ERM can provide it with the token.

In one embodiment, the network orchestrator generates the token in response to the detecting the new media node (or after making a decision to add a new media node). The network orchestrator can then provide the token to the media node in parallel with providing the token to the firewall. In this example, the firewall can receive the preauthorized token after the media node receives its token, or while the media node is being added to the media production environment.

At block 420, the firewall detects a media flow corresponding to the media node. In one embodiment, the media node embeds the token in the media flow. At block 425, the firewall determines whether the media flow contains a preauthorized token. That is, the firewall compares the token in the media flow with the tokens that were preauthorized at block 405. If the token in the media flow matches a preauthorized token, then the method 400 proceeds to block 435 where the firewall permits the media flow to communicate with the on-premises production environment.

Otherwise, at block 430, the firewall blocks the media flow. In this manner, the SDNO can leverage its knowledge learned from the ERM about the media nodes, as well as its position of trust with the firewall, to provide tokens to both the media nodes and the firewall so that the firewall can authenticate the media flow generated by the media node using the token. Using tokens to authenticate the media nodes can provide extra security when the public internet is being used to communicate between the media nodes and the on-premises production environment.

Figure 5:
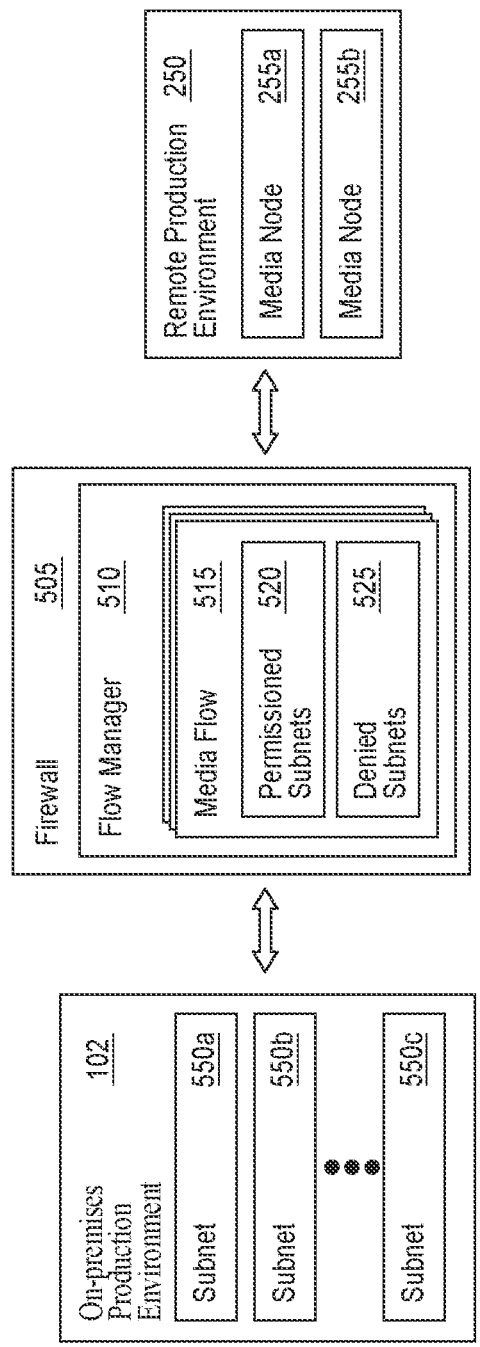
FIG. 5 illustrates micro segmenting an on-premises production environment, according to one embodiment.

FIG. 5 illustrates micro segmenting the on-premises production environment 102, according to one embodiment. In this example, the production environment 102 includes multiple subnets 550a-550c (or microsegments). In one embodiment, each of the subnets 550 corresponds to a different application or service. As such, a media node 255 in the remote production environment 250 may be used as part of the application or service performed by one or more of the subnets 550 but not by the other subnets 550. For example, the media node 255a may perform tasks for the service executed by the subnet 550a but not the subnets 550b and 550c. In contrast, the media node 255b may participate in the services performed by the subnets 550b and 550c but not the subnet 550a.

To increase data security and integrity, it may be advantageous that the media nodes 255 are permitted to communicate with only the subnets 550 to which they are assigned. In this example, the firewall 505 includes a flow manager 510 which defines a media flow 515 for each of the media nodes 255. That is, the flow manager 510 may maintain a database that provides permissions for the media flow 515 for each of the media nodes 255 in the remote production environment 250. These media flows 515 indicate which subnets 550 the corresponding media nodes 255 can communicate with (i.e., permissioned subnets 520) and which subnets 550 the media nodes 255 cannot communicate with (i.e., denied subnets 525). In one embodiment, the flow manager may maintain only a list of the permissioned subnets 520 and it is assumed that any subnet 550 that is not a permissioned subnet 520 is a denied subnet 525.

Figure 6:
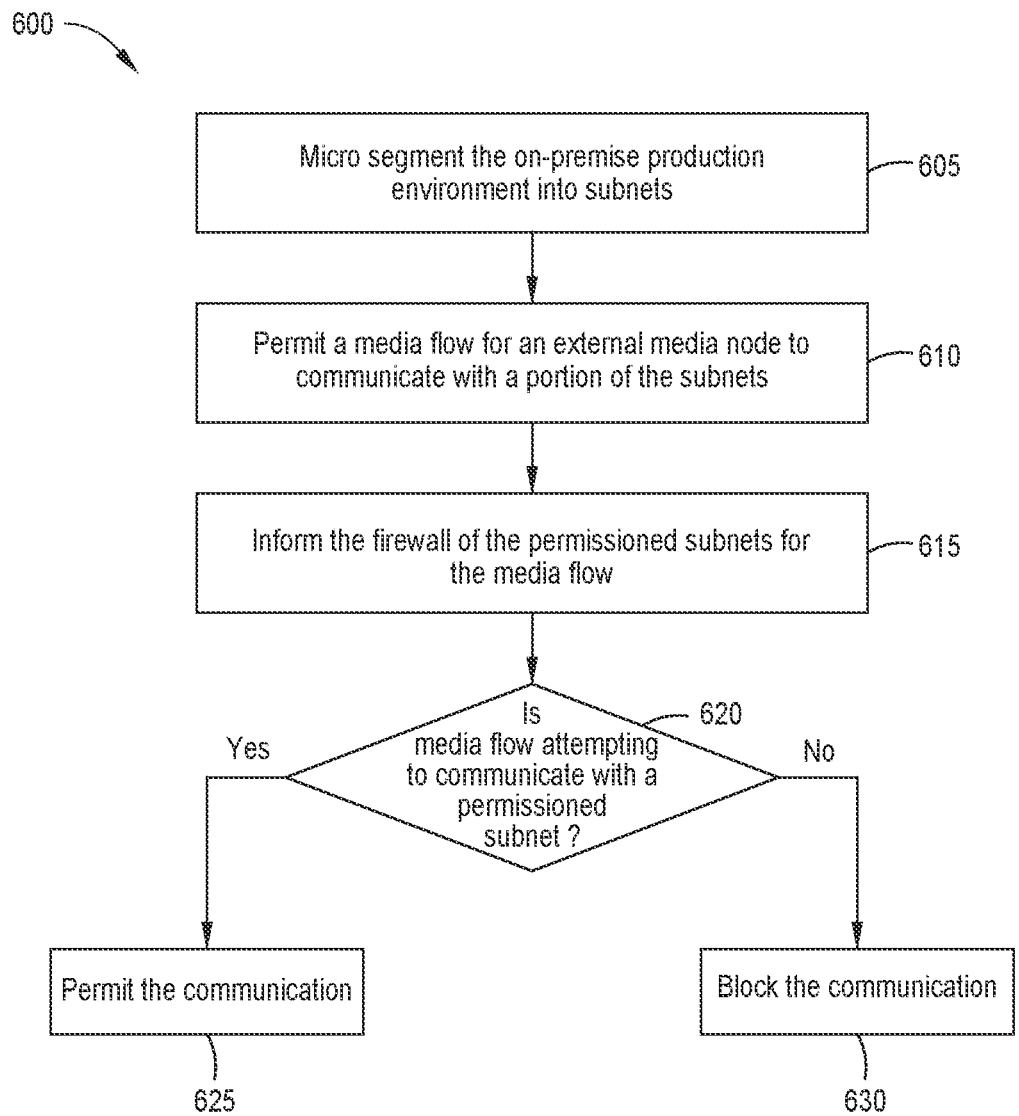
FIG. 6 is a flowchart for operating a firewall with a micro segmented media production environment, according to one embodiment.

When receiving a media flow from the media nodes 255 at the firewall 505, the flow manager 510 can reference the corresponding media flow 515 for that media node 255 and determine whether the media node 255 is attempting to communicate with a permissioned subnet 520 or a denied subnet 525. This is explained in more detail in FIG. 6 which illustrates a method 600 for operating a firewall with a micro segmented media production environment.

At block 605, an engineer micro segments the on-premises production environment into subnets. In one embodiment, these subnets correspond to different media applications or media services. The subnets can include separate media resources and corresponding network devices (e.g., routers and switches) for communicating between those resources.

At block 610, SDNO permits a media flow from an external media node to communicate with at least one of the subnets. For example, when adding a media node to a remote production environment, SDNO may assign the media node to help with a particular media application or service (or multiple applications or services). SDNO can, in turn, inform the media node which subnet(s) it should communicate with in the on-premises production environment.

In one embodiment, rather than SDNO informing the media node which subnet to communicate with in the on-premises production environment, this may be done by an engineer or system administrator.

At block 615, SDNO informs the firewall of the permissioned subnets for the media flow. In this manner, the firewall knows which subnets in the on-premises production environment the media flow is permitted to communicate with.

At block 620, the flow manager in the firewall determines whether the media is attempting to communicate with a permissioned subnet or a denied subnet. For example, the flow manager can use identification data in the media flow to identify a list of permissioned subnets the media node generating the media flow is permitted to access.

If the media node is permitted to communicate with the subnet, the method 600 proceeds to block 625 where the firewall permits the communication. Otherwise, the method 600 proceeds to block 630 where the firewall blocks the communication.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a non-transitory computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
   providing a silo in a firewall containing a rule set that is preauthorized for dynamic changes, wherein the firewall protects an on-premises media production environment;
   detecting at least one of an addition or a subtraction of a media node in a remote media production environment;
   generating a rule change for the firewall that at least one of (i) permits an added media node to communicate with the on-premises media production environment or (ii) prohibits a subtracted media node from communicating with the on-premises media production environment;
   transmitting the rule change to the firewall; and upon determining, at the firewall, that the rule change affects the rule set in the silo, updating the rule set based on the rule change.

2. The method of claim 1, wherein generating the rule change for the firewall and updating the rule set based on the rule change are performed programmatically without human intervention.

3. The method of claim 1, further comprising:
providing a second silo in the firewall containing a second rule set that is not preauthorized for dynamic changes, wherein updates to the second rule set require human intervention.

4. The method of claim 1, wherein the rule change permits the added media node to communicate with the on-premises media production environment by at least one of (i) enabling a media flow received from the added media node to pass through the firewall using an IP address corresponding to the added media node or (ii) opening a port corresponding to the added media node.

5. The method of claim 1, wherein the rule change prohibits the subtracted media node from communicating with the on-premises media production environment by at least one of (i) preventing a media flow received from the subtracted media node from passing through the firewall using an IP address corresponding to the subtracted media node or (ii) closing a port corresponding to the subtracted media node.

6. The method of claim 1, wherein the media node comprises an audio or video source.

7. The method of claim 1, further comprising:
preauthorizing a set of tokens at the firewall;
assigning one of the preauthorized tokens to the media node; and
upon determining, at the firewall, that a media flow received from the media node includes one of the preauthorized tokens, permitting the media flow to reach the on-premises media production environment.

8. The method of claim 1, further comprising:
providing a plurality of subnets in the on-premises media production environment;
permitting a media flow for the media node to communicate with a subportion of the plurality of subnets;
informing the firewall that the media flow is permitted to communicate with the subportion of the plurality of subnets; and
upon determining, at the firewall, that the media flow of the media node is attempting to communicate with one of the subportion of the plurality of subnets, permitting the media flow to reach the one of the subportion of the plurality of subnets.

9. A system comprising:
a local network configured to provide a service;
a firewall configured to protect the local network from unauthorized access, wherein the firewall comprises:
a first silo containing a first rule set preauthorized for dynamic changes, and
a second silo containing a second rule set that is not authorized for dynamic changes; and
a network orchestrator configured to:
detect at least one of an addition or a subtraction of a computing resource in a remote network, wherein the computing resource is configured to perform tasks corresponding to the service in the local network,
generate a rule change for the firewall that at least one of (i) permits an added computing resource to communicate with the service in the local network or (ii) prohibits a subtracted computing resource from communicating with the local network, and
transmit the rule change to the firewall, wherein the firewall is configured to update the first rule set based on the rule change only after determining the rule change affects the first rule set in the first silo and not the second rule set in the second silo.

10. The system of claim 9, wherein generating the rule change for the firewall and updating the first rule set based on the rule change are performed programmatically without human intervention.

11. The system of claim 9, wherein updates to the second rule set require human intervention.

12. The system of claim 9, wherein the rule change permits the added computing resource to communicate with the service in the local network by at least one of (i) enabling an IP flow received from the added computing resource to pass through the firewall using an IP address corresponding to the added computing resource or (ii) opening a port corresponding to the added computing resource.

13. The system of claim 9, wherein the computing resource comprises an audio or video source.

14. The system of claim 9, wherein the network orchestrator is configured to:
preauthorize a set of tokens at the firewall; and
assign one of the preauthorized tokens to the computing resource,
wherein the firewall is configured to, upon determining that an IP flow received from the computing resource includes one of the preauthorized tokens, permit the IP flow to reach the local network.

15. The system of claim 9, wherein the local network comprises a plurality of subnets, wherein the network orchestrator is configured to:
permit an IP flow for the computing resource to communicate with a subportion of the plurality of subnets, and
inform the firewall that the IP flow is permitted to communicate with the subportion of the plurality of subnets,
wherein the firewall is configured to, upon determining that the IP flow of the computing resource is attempting to communicate with one of the subportion of the plurality of subnets, permit the IP flow to reach the one of the subportion of the plurality of subnets.

16. A non-transitory computer readable medium having program instructions embodied therewith, the program instructions executable by a processor to perform an operation, the operation comprising:
providing a silo in a firewall containing a rule set that is preauthorized for dynamic changes, wherein the firewall protects an on-premises media production environment;
detecting at least one of an addition or a subtraction of a media node in a remote media production environment;
generating a rule change for the firewall that at least one of (i) permits an added media node to communicate with the on-premises media production environment or (ii) prohibits a subtracted media node from communicating with the on-premises media production environment;
transmitting the rule change to the firewall; and
upon determining, at the firewall, that the rule change affects the rule set in the silo, updating the rule set based on the rule change.

17. The non-transitory computer readable medium of claim 16, wherein generating the rule change for the firewall and updating the rule set based on the rule change are performed programmatically without human intervention.

18. The non-transitory computer readable medium of claim 16, the operation further comprising:
providing a second silo in the firewall containing a second rule set that is not preauthorized for dynamic changes, wherein updates to the second rule set require human intervention.

19. The non-transitory computer readable medium of claim 16, wherein the rule change permits the added media node to communicate with the on-premises media production environment by at least one of (i) enabling a media flow received from the added media node to pass through the firewall using an IP address corresponding to the added media node or (ii) opening a port corresponding to the added media node.

20. The non-transitory computer readable medium of claim 16, the operation further comprising:
preauthorizing a set of tokens at the firewall;
assigning one of the preauthorized tokens to the media node; and
upon determining, at the firewall, that a media flow received from the media node includes one of the preauthorized tokens, permitting the media flow to reach the on-premises media production environment.

21. The non-transitory computer readable medium of claim 16, the operation further comprising:
providing a plurality of subnets in the on-premises media production environment;
permitting a media flow for the media node to communicate with a subportion of the plurality of subnets;
informing the firewall that the media flow is permitted to communicate with the subportion of the plurality of subnets; and
upon determining, at the firewall, that the media flow of the media node is attempting to communicate with one of the subportion of the plurality of subnets, permitting the media flow to reach the one of the subportion of the plurality of subnets.

* * * * *